United States Patent
Sauls et al.

(10) Patent No.: US 8,751,476 B2
(45) Date of Patent: *Jun. 10, 2014

(54) SYNONYM AND SIMILAR WORD PAGE SEARCH

(75) Inventors: Cullen Sauls, Redmond, WA (US); Travis Leithead, Bellevue, WA (US); Roland Tokumi, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 770 days.

This patent is subject to a terminal disclaimer.

(21) Appl. No.: 12/881,385

(22) Filed: Sep. 14, 2010

(65) Prior Publication Data

US 2010/0333000 A1 Dec. 30, 2010

Related U.S. Application Data (63) Continuation of application No. 11/709,597, filed on Feb. 22, 2007, now Pat. No. 7,822,763.

(51) Int. Cl.
*G06F 17/30* (2006.01)

(52) U.S. Cl.
USPC ............ 707/707; 707/736; 707/769; 707/779

(58) Field of Classification Search
USPC .................................. 707/707, 769, 736, 779
See application file for complete search history.

(56) References Cited

U.S. PATENT DOCUMENTS

| | | | |
|---|---|---|---|
| 5,488,725 A | 1/1996 | Turtle et al. | |
| 5,649,221 A | 7/1997 | Crawford et al. | |
| 6,421,675 B1 | 7/2002 | Ryan et al. | |
| 6,484,165 B1 | 11/2002 | Beall et al. | |
| 6,845,372 B2 | 1/2005 | Bates et al. | |
| 6,847,960 B1 | 1/2005 | Li et al. | |
| 6,976,019 B2 | 12/2005 | Davallou | |
| 7,571,161 B2 | 8/2009 | Watson | |
| 7,822,763 B2 | 10/2010 | Sauls | |
| 2002/0010639 A1 | 1/2002 | Howey et al. | |

(Continued)

FOREIGN PATENT DOCUMENTS

| | | |
|---|---|---|
| KR | 10-2003-0066064 | 8/2003 |
| KR | 10-2004-0063641 | 7/2004 |
| WO | WO-03042870 | 5/2003 |

OTHER PUBLICATIONS

Blachman, Nancy "Google Guide: Making Searching Even Easier", Available at <http://www.googleguide.com/print/query_input.pdf>,pp. 1-43.

(Continued)

*Primary Examiner* — Cindy Nguyen
(74) *Attorney, Agent, or Firm* — Andrew Sanders; Micky Minhas; Wolfe-SBMC (57) ABSTRACT

A search tool enables users to search for synonyms of, and/or syntactically similar words to search terms that they enter. In at least some embodiments, the search tool is implemented in the context of a web browser for searching web pages. In some embodiments, search terms can be distinctly, visually highlighted on a page, such as a web page, to allow the user to easily identify words that have been found through the search. In at least some embodiments, color coding can be used to uniquely identify exact matches, synonyms and/or syntactically similar words that are identified on a page.

20 Claims, 6 Drawing Sheets

(56) References Cited

U.S. PATENT DOCUMENTS

| | | |
|---|---|---|
| 2004/0034629 A1 | 2/2004 | Genser |
| 2004/0059564 A1 | 3/2004 | Zhou |
| 2004/0064447 A1* | 4/2004 | Simske et al. .................. 707/5 |
| 2005/0171760 A1 | 8/2005 | Tinkler et al. |
| 2005/0209992 A1 | 9/2005 | Kikinis et al. |
| 2006/0041530 A1 | 2/2006 | Milic-Frayling et al. |
| 2006/0248078 A1 | 11/2006 | Gross et al. |
| 2007/0038615 A1 | 2/2007 | Vadon et al. |
| 2007/0088695 A1 | 4/2007 | Bleyendaal et al. |
| 2007/0214126 A1 | 9/2007 | Kikinis |
| 2008/0177717 A1 | 7/2008 | Kumar et al. |
| 2008/0208835 A1 | 8/2008 | Sauls |

OTHER PUBLICATIONS

Wang, et al., "Scalable Search-Based Image Annotation of Personal Images", http://delivery.acm.org/10.1145/1180000/1178714/p269-wang.pdf?key1=1178714&key2=2512624611&coll=ACM&dl=ACM&CFID=15151515&CFTOKEN=6184618, (Oct. 1, 2006).

"Non Final Office Action", U.S. Appl. No. 11/709,597, (Jan. 22, 2009, 17 pages.

"Final Office Action", U.S. Appl. No. 11/709,597, (Jun. 1, 2009), 12 pages.

"Non-Final Office Action", U.S. Appl. No. 11/709,597, (Oct. 7, 2009), 12 pages.

"Non-Final Office Action", U.S. Appl. No. 11/709,597, (Mar. 5, 2010), 17 pages.

Bolin Michael "Automation and Customization of Rendered Web Pages", *UIST '05*, (Oct. 2005),pp. 1-10.

"PCT Search Report and Written Opinion", Application No. PCT/US2008/054193, (Jul. 15, 2008), 14 pages.

"Notice of Allowance", U.S. Appl. No. 11/709,597, (Jul. 22, 2010), 7 pages.

* cited by examiner

SYNONYM AND SIMILAR WORD PAGE SEARCH

RELATED APPLICATIONS

This application is a continuation of and claims priority under 35 U.S.C. §120 to U.S. patent application Ser. No. 11/709,597, entitled "Synonym and Similar Word Page Search" and filed Feb. 22, 2007, the disclosure of which is incorporated by reference herein in its entirety.

BACKGROUND

Often times when a user wishes to electronically search for text on a particular page or within a particular document, the user is limited to searching for a text string that has an exact or partial match with a search string entered by the user. While this functionality is useful in some respects, it does not provide the user with a high degree of flexibility in conducting searches.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one or more embodiments, a search tool enables users to search for synonyms of search terms that they enter. In one or more other embodiments, a search tool enables users to search for syntactically similar words to search terms that they enter. In at least some embodiments, a search tool provides the user with the ability to search for one or both of synonyms or syntactically similar words to search terms that they enter. In at least some embodiments, the search tool is implemented in the context of a web browser and can be utilized for searching web pages.

In one or more embodiments, search results for search terms can be distinctly, visually highlighted on a page, such as a web page, to allow the user to easily identify words that have been found through the search. In at least some embodiments, color coding can be used to uniquely identify exact matches, synonyms and/or syntactically similar words that are identified on a page.

BRIEF DESCRIPTION OF THE DRAWINGS

The same numbers are used throughout the drawings to reference like features.

DETAILED DESCRIPTION

Overview

In one or more embodiments, a search tool enables users to search for synonyms of search terms that they enter into a suitably configured user interface. For example, if the user is interested in searching for the word "patch", as such pertains to patches for software bugs, suitably configured software can search one or more pages of interest for words including "update", "fix", "correction" and the like. In addition, in at least some embodiments, search results can be presented to the user in a visually distinct way so as to distinguish between exact matches and synonyms. For example, color coding using one color can be used to identify exact matches while color coding using another color can be used to identify synonyms.

In one or more other embodiments, a search tool enables users to search for syntactically similar words to search terms that they enter into the user interface. For example, if a user enters the term "add-ons" into a user interface, suitably configured software can search one or more pages of interest for words including "addons" or "add ons". In addition, in at least some embodiments, search results can be presented to the user in a visually distinct way so as to distinguish between exact matches and syntactically similar words. For example, color coding using one color can be used to identify exact matches while color coding using another color can be used to identify the syntactically similar words.

In at least some embodiments, a search tool provides the user with the ability to search for one or both of synonyms of, or syntactically similar words to search terms that they enter. In these embodiments, search results can be presented to the user in a visually distinct way so as to distinguish between exact matches, synonyms and/or syntactically similar words.

In at least some embodiments, the search tool can integrate with a spell-checking system to correct for errors and look for common spelling mistakes.

In at least some embodiments, the search tool is implemented in the context of a web browser and can be utilized for searching web pages.

In the discussion that follows, a section entitled "Example System" is provided and describes one system in which one or more embodiments can be employed. Following this, a section entitled "Example Search Tool" is provided and describes various characteristics of a search tool in one or more embodiments. Next, a section entitled "Example Computing System" is provided and describes a computing system that can be used to implement one or more embodiments.

Example System

Figure 1:
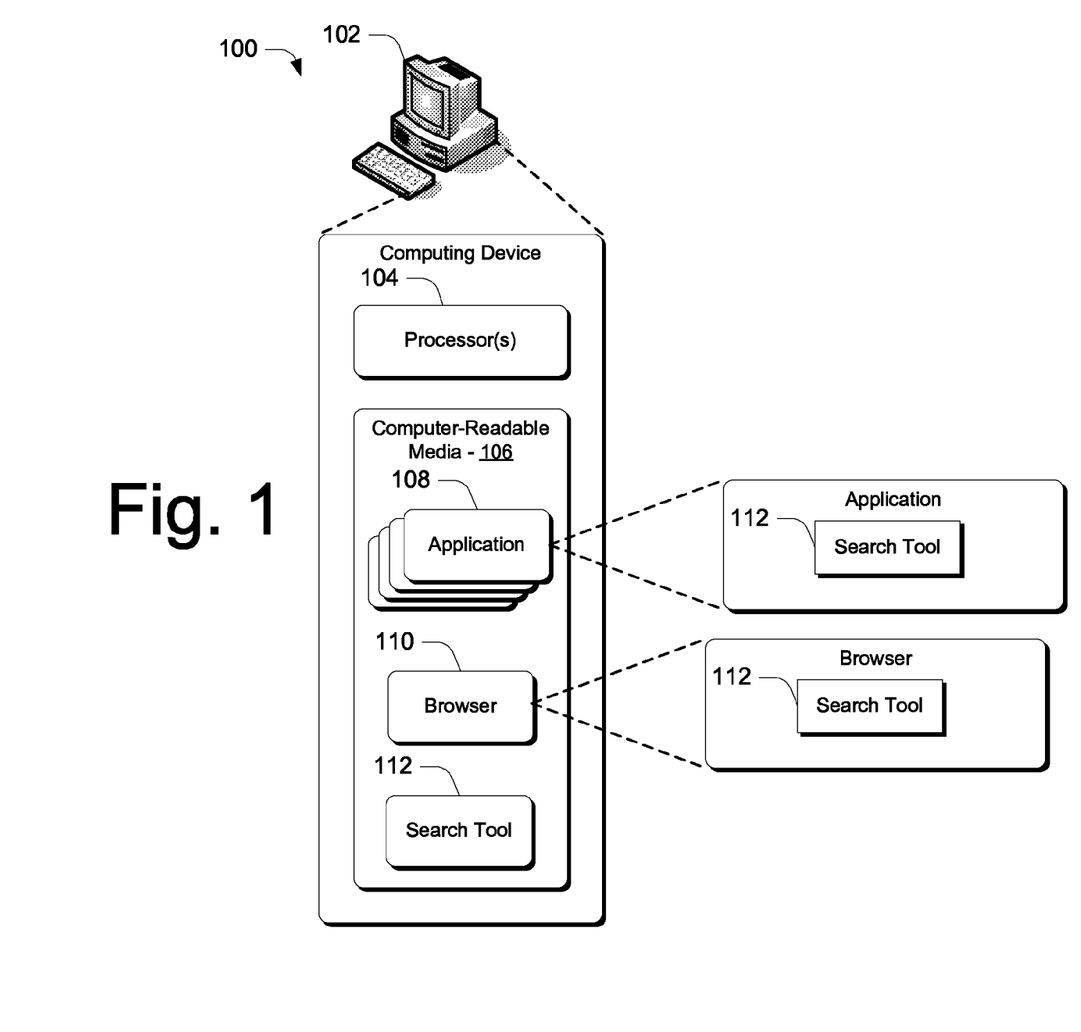
FIG. 1 illustrates a system in which various principles described herein can be employed in accordance with one or more embodiments.

FIG. 1 illustrates a system in accordance with one or more embodiments, generally at 100. System 100 includes a computing device 102 having one or more processors 104, one or more computer-readable media 106 and one or more applications 108 that reside on the computer-readable media and which are executable by the processor(s). The computer-readable media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 6.

Computing device 102 also includes, in at least some embodiments, software in the form of a web browser 110. Any suitable web browser can be used examples of which are available from the assignee of this document and others.

In one or more embodiments, a search tool 112 is provided and can provide search functionality such as that described above and below. The illustrated and described search tool can be implemented in any suitable way. For example, in at least some embodiments, the search tool can be implemented as a standalone tool that can be utilized or otherwise leveraged by one or more applications 108 or web browser 110. Hence, one depiction of the search tool in FIG. 1 is as a standalone component. Alternately or additionally, the search tool can be integrated into an application or web browser. Hence, the search tool is also depicted as comprising part of an application or web browser.

Although computing device 102 is illustrated in the form of a desktop computer, it is to be appreciated and understood that other computing devices can be utilized without departing from the spirit and scope of the claimed subject matter. For example, other computing devices can include, by way of example and not limitation, portable computers, handheld computers such as personal digital assistants (PDAs), cell phones and the like.

Having described an example computing environment in which various embodiments of a search tool can be employed, consider now various characteristics of an example search tool in accordance with one or more embodiments.

Example Search Tool

Figure 2:
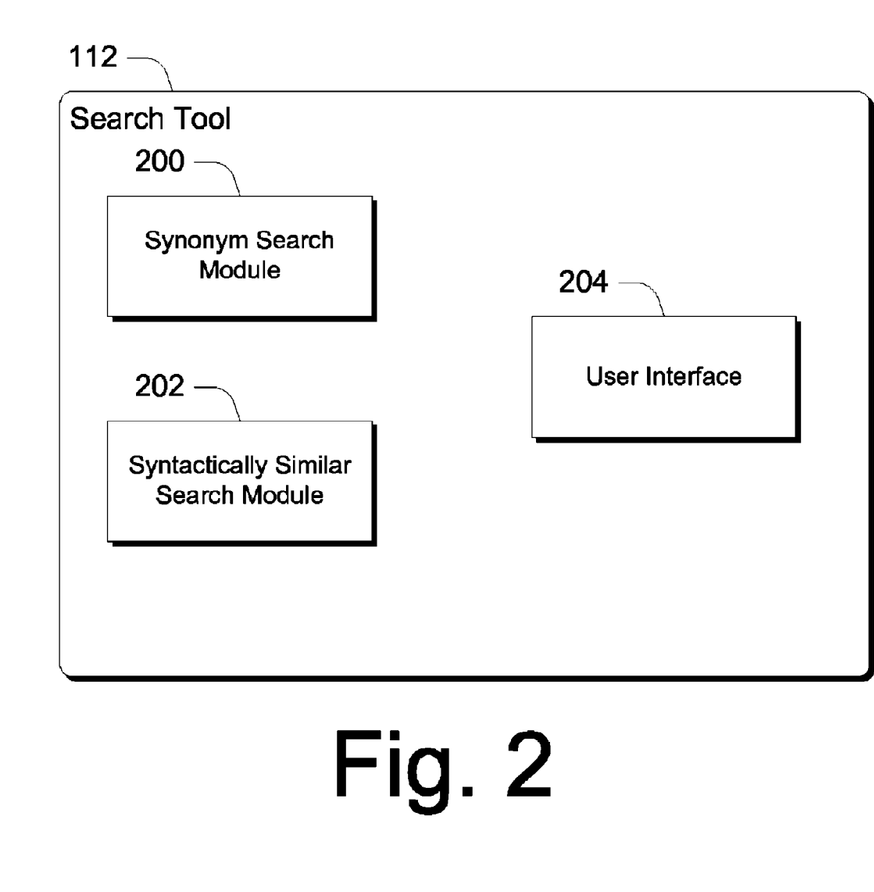
FIG. 2 illustrates an example search tool in accordance with one or more embodiments.

FIG. 2 provides a more detailed illustration of search tool 112 in accordance with one or more embodiments. The search tool can be implemented in connection with any suitable hardware, software, firmware or combination thereof In one or more embodiments, the search tool is implemented in the form of computer-readable instructions that reside on some type of computer-readable media examples of which are provided above and below.

In this example, search tool 112 comprises a synonym search module 200, a syntactically similar search module 202, and a user interface component 204. It is to be appreciated and understood that while the search tool is illustrated as including both modules 200 and 202, it may include one or the other of the modules, along with the user interface component 204.

Synonym Search Module

In one or more embodiments, synonym search module 200 can enable a user to search for synonyms of search terms that they enter into a suitably configured user interface, such as one provided by user interface component 204 described below. For example, if the user is interested in searching for the word "patch" as such pertains to patches for software bugs, suitably configured software can search one or more pages of interest for words including "update", "fix", "correction" and the like. In one or more embodiments, module 200 can utilize or otherwise leverage a thesaurus that can be maintained locally on the local computing device and/or remotely, such as on a server that is accessible via a network such as the Internet.

Accordingly, when a user enters a search term via a user interface, the search tool can search for not only exact matches, but it can also ascertain, from a suitably configured thesaurus, one or more synonyms associated with the search term. The search tool can then search one or more pages of interest for not only exact matches, but also for synonym matches as well. In embodiments where the search tool is implemented in connection with a web browser, the pages that are searched reside in the form of web pages. In other implementations, the pages reside as pages that are provided or otherwise rendered by the application that is utilizing the search tool. For example, if the search tool is being utilized by a word processing application, the pages would comprise those that are rendered or otherwise provided by the word processing application.

The search results can be displayed in any suitable way examples of which are provided below.

Syntactically Similar Module

In one or more embodiments, syntactically similar search module 202 can enable a user to search for syntactically similar terms of search terms that they enter into a suitably configured user interface, such as one provided by user interface component 204 described below. For example, if a user enters the term "add-ons" into a user interface, suitably configured software can search one or more pages of interest for words including "addons" or "add ons". In one or more embodiments, module 202 can utilize or otherwise leverage a source of syntactically similar terms that can be maintained locally on the local computing device and/or remotely, such as on a server that is accessible via a network such as the Internet.

Accordingly, when a user enters a search term via a user interface, the search tool can search for not only exact matches, but it can also ascertain, from a suitably configured source of syntactically similar words, one or more syntactically similar words associated with the search term. Alternately or additionally, the source of syntactically similar words can comprise any suitable algorithm that can generate, on the fly, syntactically similar words. The search tool can then search one or more pages of interest for not only exact matches, but also for these similar matches as well. In addition, searching for syntactically similar words or phrases can also include searching for words that are spelled differently in different languages or for words that are spelled differently. For example, the word "color" can also be spelled "colour". Likewise, the word "through" can also be spelled "thru". In various embodiments, these differently spelled versions of words can also be the subject of a search.

In embodiments wherein the search tool is implemented in connection with a web browser, the pages reside in the form of web pages. In other implementations, the pages reside as pages that are provided or otherwise rendered by the application that is utilizing the search tool. For example, if the search tool is being utilized by a word processing application, the pages would comprise those that are rendered or otherwise provided by the word processing application.

The search results can be displayed in any suitable way examples of which are provided below.

User Interface Component

In one or more embodiments, user interface component 204 can include two separate but related user interface functionalities. First, user interface component 204 can include a user interface display that can enable a user to enter their particular search terms. Second, user interface component 204 can include a user interface display that can enable a user to view their particular results.

Figure 3:
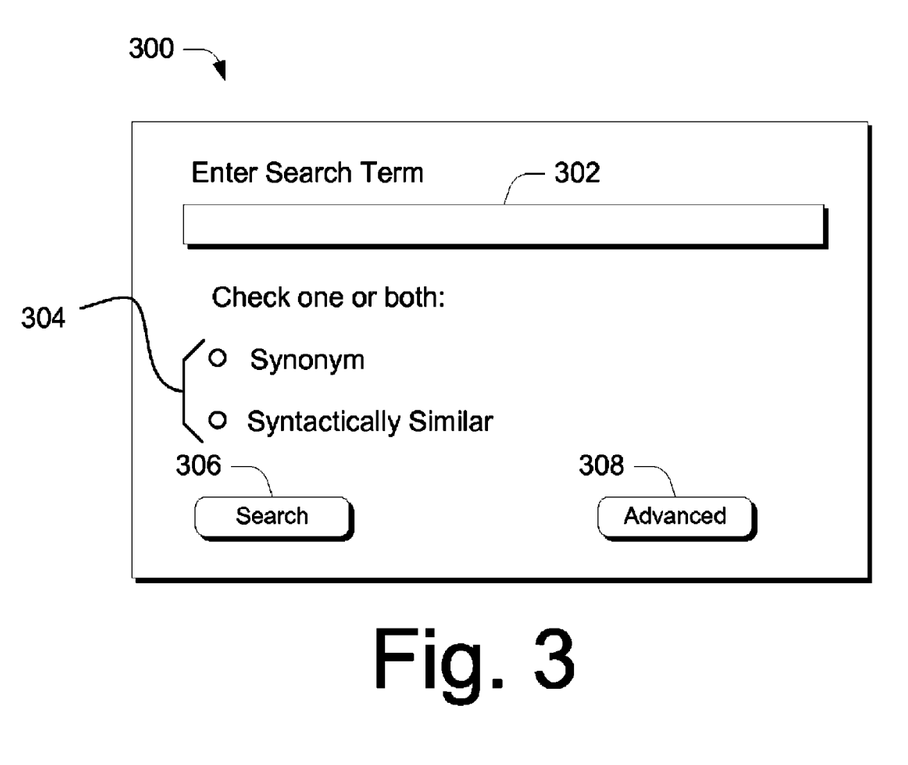
FIG. 3 illustrates an example user interface in accordance with one or more embodiments.

As an example of a user interface display that can enable a user to enter their particular search terms, consider FIG. 3. There, an example user interface is shown generally at 300 and includes, in this example, a search box 302 in which a user can enter a search term and an interface portion 304 in which a user can provide input as to what kind of search they wish to perform. In this example, user interface 300 allows the user to specify one or both of a synonym search or a syntactically similar word or term search by simply clicking on or otherwise checking an associated check box. In addition, user interface includes a search button 306 that a user can select after they have entered their search terms and selected the type of search they wish to conduct.

Further, in one or more embodiments, the user interface can provide an "Advanced" option button 308 to enable the user to further refine the search that they conduct. As an example, consider the following. In the context of a synonym search, it is possible that a word has a number of synonyms that can be grouped in different contexts. For example, the word "patch" has a number of different synonyms that can be considered as residing in different contextual groups. For example, in the context of a software "patch", suitable synonyms can include "update", "fix" or "correction". In a different context, "patch" may have synonyms that include "bandage", "covering" or "dressing". Accordingly, in situations such as these and others, the "Advanced" options button can present the user with an opportunity to select one or more contexts within which to search. These particular contextual choices can be maintained as part of a thesaurus and/or a collection of groups that is associated with a thesaurus and accessible by the search software. In addition, search results that are found using the "Advanced" options button can be saved and later used for training to improve future page searches.

Figure 4:
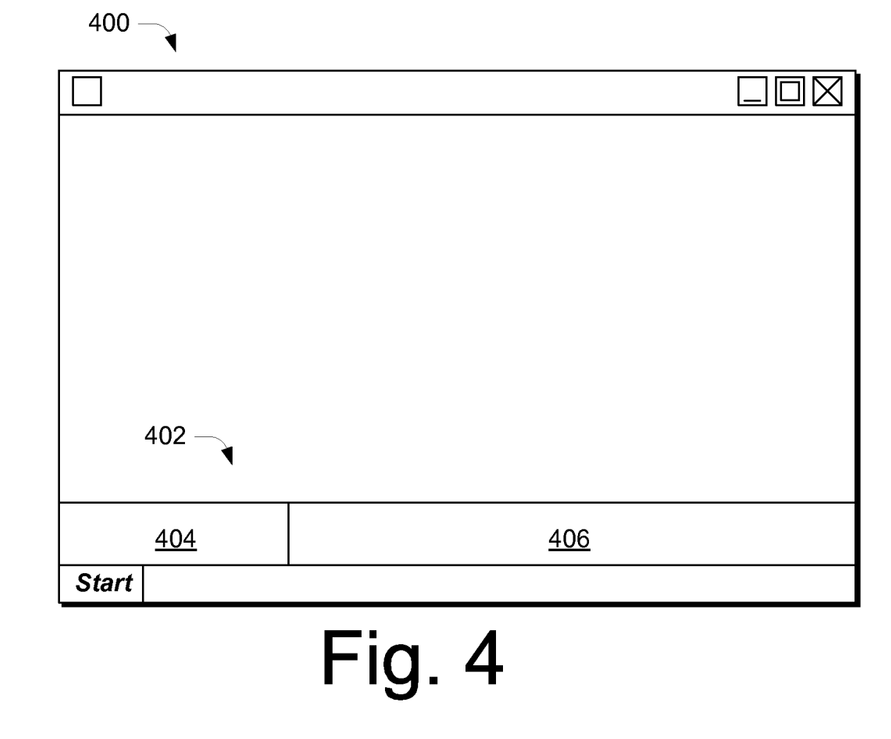
FIG. 4 illustrates an example implementation in accordance with one or more embodiments.

Having discussed the general notion of a user interface that can be used to implement the search functionality described above and below, consider now how such a user interface can be incorporated for use with a web browser. Specifically, FIG. 4 illustrates an example web browser user interface generally at 400. User interface 400 includes, in this example, a search user interface 402 that includes a portion 404 in which a user can enter their search terms and a portion 406 in which a user can specify the type of search they wish to perform. In this example, user interface portion 404 can provide a search box, similar to the search box of FIG. 3. Likewise, the other user interface instrumentalities of FIG. 3 can be presented in portion 406.

In this manner, a user can enter particular search terms and then select various searches to be performed on one or more web pages.

As noted above, user interface component 204 also includes functionality that presents a user's search results in a visually distinctive way. For example, when a user opts to perform one or both of the synonym or syntactically similar searches, the search results as between exact matches, and matches for synonyms and/or syntactically similar words or terms can be presented in a visually unique manner so as to identify the differences between the search results.

For example, in one or more embodiments, various color coding techniques can be used to present the different types of search results. As an example, exact matches might be highlighted on a page in yellow and synonym searches might be highlighted in green. Similarly, if a user opts to perform a syntactically similar search, those search results might be displayed highlighted in red. Thus, color coding techniques can be used to visually distinguish the search results into their various types. In some embodiments, a user may further filter search results by clearing a checkbox. For example, if the user performs a search for both synonyms and syntactically similar words, the user might then uncheck the syntactically similar words to clear out the associated color coded results.

In one or more embodiments, search results can be displayed within the context of the page in which they appear. In this manner, the text of the page remains displayed with the various search terms appearing highlighted in the appropriate color. Alternately or additionally, the search results can be displayed in a concise list form with minimal context. In this example, the list might be displayed to the side of the page that is being searched. By clicking on a particular search result, the user can be navigated to the first and additional instances of the search result. Alternately or additionally, the search results can be displayed by subdividing and condensing the original page, based on the number of search results, to show a few words that appear just before and just after search results. This can provide the user with some context surrounding the search results and, at the same time, increase the number of search results that are displayed on the user's monitor. It is to be appreciated and understood that any suitable manner of presenting the search results can be utilized without departing from the spirit and scope of the claimed subject matter.

The above-described search functionality can be implemented in any suitable way and in any suitable manner. For example, the functionality can be implemented in connection with a search engine and/or in connection with or as part of an application such as a web browser. In addition, the searches can be conducted on a letter-by-letter basis. Alternately or additionally, the searches can be conducted utilizing indexing techniques which will be appreciated by those of skill in the art.

In addition, in one or more embodiments, when a user enters a search term, the searching functionality can conduct a spell check to ascertain whether the search term might be misspelled. If so, alternate spellings of the search term can then be suggested.

Example Method

Figure 5:
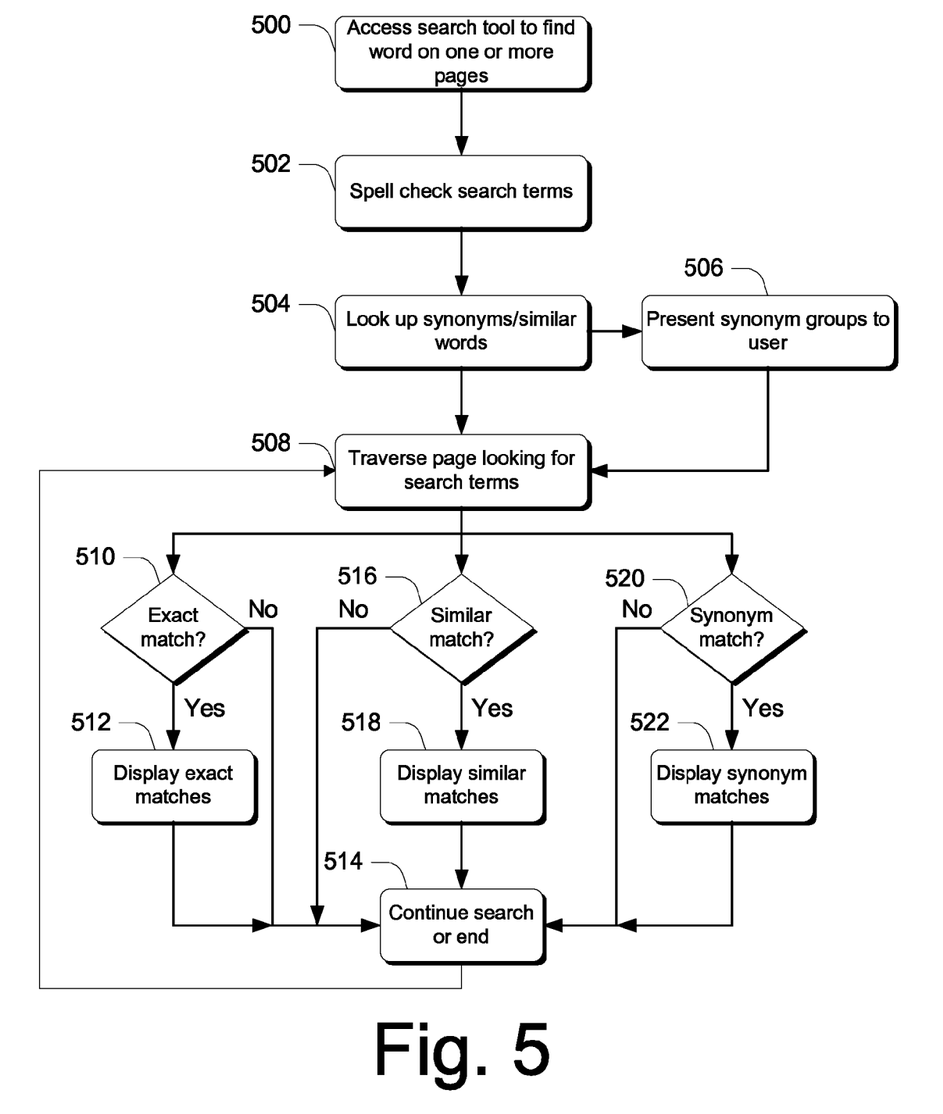
FIG. 5 illustrates steps in an example method in accordance with one or more embodiments.

FIG. 5 is a flow diagram that describes steps in a method in accordance with one embodiment. The method can be performed in connection with any suitable hardware, software, firmware or combination thereof In one or more embodiments, the method can be implemented in software in the form of a search module or tool such as that described above. As noted, the search module or tool can comprise a standalone search module or tool, such as that which resides in the form of a search engine. Alternately or additionally, the search module or tool can be more closely integrated with an application. Examples of applications include word processing applications, email applications, instant messaging applications, web browsers and the like.

Step 500 accesses the search tool to find a word on one or more pages. This step can be performed in any suitable way using any suitable user interface, examples of which are given above. In this example, the user can be presented with a user interface that enables them to select one or more different types of search such as the synonym and/or syntactically similar searches described above. Assume in this example, that the user has selected to perform both searches, in addition to an exact word search, and enters their search term via the user interface. In one or more embodiments, much of the processing described just below can be performed without subsequent user action. That is, in one or more embodiments, much of the processing described just below can take place in the background. In this manner, once the user enters their search term, they can regain control of the page and the search will be conducted as a background task, with search results being displayed as described above and below.

The search term is received and step 502 optionally spell checks the search term and, if appropriate, offers options for misspelled words. Step 504 looks up or otherwise ascertains synonyms and/or syntactically similar words relative to the search term entered by the user. This step can be performed in any suitable way, examples of which are provided above.

Additionally and optionally, step 506 presents synonym groups to the user. Recall that individual search terms can have synonyms that reside in contextually different groups. In one or more embodiments, the user can be given an option to select a particular synonym group. This step can be performed automatically, as by automatically presenting the user with a user interface component so that they can either make a selection or dismiss the user interface. Alternately or additionally, this step can be performed by presenting the user with a user interface button or some other instrumentality that they can select to then access synonym groups for choosing a particular group.

Continuing, step 508 traverses one or more pages looking for search terms, their synonyms and/or their syntactic similarities. The step can be performed in any suitable way examples of which are provided above. Further, in embodiments in which the method is implemented by a web browser, the traversal can take place over multiple different web pages. For example, in the tabbed browsing environment, the traversal can take place over pages that are opened in one or more tabs, as well as the web page that the user is currently viewing. Further, traversal can take place by traversing pages that are maintained in an offline store. For example, some web browsers can maintain an offline store in which various web pages can be stored. In this case, in at least some embodiments, the traversal operation can include traversing these pages.

At this point, the method can pursue three different branches depending on the search choices made by the user. In this example, the user has elected to perform both a synonym and a syntactically similar search. Hence, the exact match branch and the two associated other branches of the method are followed. While the description of different branches proceeds in a serial fashion below, it is to be appreciated and understood that the actual execution of the branches can take place serially or in parallel.

Specifically, step 510 ascertains whether there are any words on the page(s) that constitute an exact match. If so, then step 512 displays the exact matches for the user. If not, step 514 continues the search or ends depending on the user's choice or some other event, such as reaching the end of a document, failing to find further search terms, searching for too long of a period of time, or some other means of termination. Here, the user has elected to perform the other two types of search, so the method returns to step 508 to traverse the page(s). Step 516 ascertains whether there are any words that constitute syntactically similar matches. If so, step 518 displays the syntactically similar matches for the user. If not, step 514 continues the search by returning to step 508 or ends the search as appropriate.

In this example, the method returns to step 508 and step 520 ascertains whether there are any words on the page(s) that constitute synonyms for the search term entered by the user. If so, step 522 displays the synonym matches for the user. If not, step 514 ends the search.

In the above example, steps 512, 518 and 522 can be performed in any suitable way using any suitable user interface examples of which are provided above.

Having now discussed an example method that can be implemented in accordance with one or more embodiments, consider now a more thorough description of an example system that can be utilized to implement one or more embodiments.

Example Computing System

Figure 6:
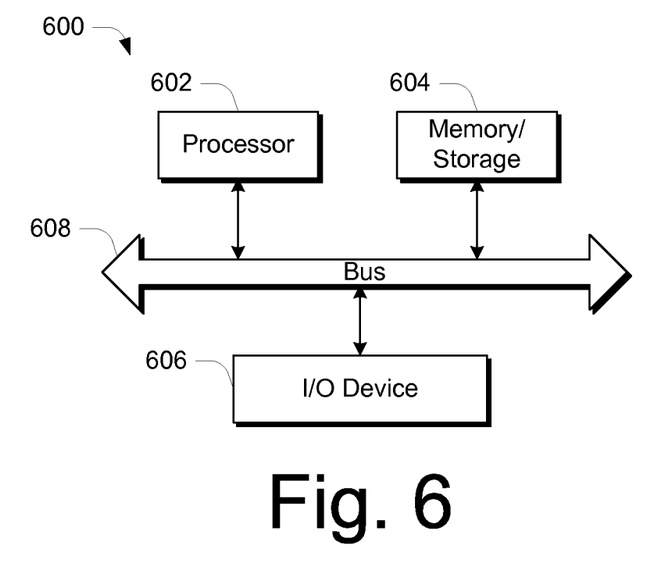
FIG. 6 illustrates an example system in accordance with one or more embodiments.

FIG. 6 illustrates an example computing device 600 that can implement the various embodiments described above. Computing device 600 can be, for example, computing device 102 of FIG. 1 or any other suitable computing device.

Computing device 600 includes one or more processors or processing units 602, one or more memory and/or storage components 604, one or more input/output (I/O) devices 606, and a bus 608 that allows the various components and devices to communicate with one another. Bus 608 represents one or more of any of several types of bus structures, including a memory bus or memory controller, a peripheral bus, an accelerated graphics port, and a processor or local bus using any of a variety of bus architectures. Bus 608 can include wired and/or wireless buses.

Memory/storage component 604 represents one or more computer storage media. Component 604 can include volatile media (such as random access memory (RAM)) and/or nonvolatile media (such as read only memory (ROM), Flash memory, optical disks, magnetic disks, and so forth). Component 604 can include fixed media (e.g., RAM, ROM, a fixed hard drive, etc.) as well as removable media (e.g., a Flash memory drive, a removable hard drive, an optical disk, and so forth).

One or more input/output devices 606 allow a user to enter commands and information to computing device 600, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Conclusion

In one or more embodiments, a search tool enables users to search for synonyms of search terms that they enter. In one or more other embodiments, a search tool enables users to search for syntactically similar words to search terms that they enter. In at least some embodiments, a search tool provides the user with the ability to search for one or both of synonyms or syntactically similar words to search terms that they enter.

In at least some embodiments, the search tool is implemented in the context of a web browser and can be utilized for searching web pages. Alternately or additionally, search terms can be distinctly, visually highlighted on a page, such as a web page, to allow the user to easily identify words that have been found through the search. In at least some embodiments, color coding can be used to uniquely identify exact matches, synonyms and/or syntactically similar words that are identified on a page.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
   presenting a search tool that enables a user to select to perform a search for search terms that the user enters, the search performed within content contained in one or more pages rendered by a web browser, wherein the search tool is configured to provide multiple selectable options to selectively include in the search one or both of synonyms of the one or more search terms or syntactically similar words to the one or more search terms;
   receiving, via the search tool, a selection of the multiple selectable options and one or more search terms entered by the user; and
   in accordance with the selection of the multiple selectable options, conducting a search by traversing the one or more rendered pages to discover one or more of exact, synonym, or syntactically similar matches of the one or more search terms.

2. The computer-implemented method of claim 1, further comprising:
   enabling, via the search tool, input of a selection of one or more contextual choices to control the search;
   receiving, via the search tool, a selection of the one or more contextual choices; and
   conducting the search in accordance with the selection of the one or more contextual choices.

3. The computer-implemented method of claim 1, further comprising:
   responsive to conducting the search, causing the web browser to highlight words that are discovered based on the search as exact, synonym, and syntactically similar matches of the one or more search terms, said words that are matches highlighted in context within the one or more rendered pages.

4. The computer-implemented method of claim 3, wherein to highlight words comprises visually displaying words that are exact matches, synonym matches, and syntactically similar matches in different visually unique ways to distinguish said matches from one another.

5. The computer-implemented method of claim 4, wherein said visually displaying words in different visually unique ways comprises using color coding techniques to display said matches.

6. The computer-implemented method of claim 1, further comprising spell checking the one or more search terms entered by the user and, if appropriate, offering options for misspelled words.

7. The computer-implemented method of claim 1 further comprising:
   opening multiple pages on multiple tabs of the web browser; and
   conducting the search across the multiple tabs.

8. A computing device comprising:
   one or more processing devices;
   computer-readable media storing instructions that, when executed via the one or more processing devices, implement a web browser configured to:
      expose a search tool that enables a user to select to perform a search within one or more pages rendered by the web browser in one or more display portions of the web browser, the search tool having multiple selectable options to selectively designate performance of a search including one or both of synonym or syntactically similar matches to search terms;
      receive, via the search tool, one or more search terms entered by the user;
      conduct a local search by traversing the one or more rendered pages to discover one or more of exact, synonym, or syntactically similar matches to the one or more search terms; and
      for words that constitute matches, highlight said words for the user in context within the one or more rendered pages.

9. The computing device of claim 8, wherein the one or more display portions of the web browser comprise one or more tabs of a tabbed browsing interface for the web browser.

10. The computing device of claim 9, wherein to conduct the local search comprises conducting the local search across pages opened in the one or more tabs for the web browser.

11. The computing device of claim 8, wherein the web browser is further configured to perform spell checking of the one or more search terms entered by the user and, if appropriate, offer options for misspelled words.

12. The computing device of claim 8, wherein to highlight said words comprises visually displaying words that are exact matches, synonym matches, and syntactically similar matches in different visually unique ways to distinguish said matches from one another.

13. The computing device of claim 12, wherein said visually displaying words in different visually unique ways comprises using color coding techniques to display said matches.

14. The computing device of claim 8, wherein the web browser is further configured to:
   present multiple synonym groups ascertained based on the one or more search terms entered by the user;
   enable a selection of a particular group of the multiple synonym groups; and
   conduct the search using the particular group that is selected.

15. One or more computer-readable storage devices storing computer-readable instructions thereon that, when executed by a computing device, implement a web browser comprising:
   a display area having one or more display portions to present one or more document pages rendered via the web browser; and
   a search tool accessible via the web browser and configured to:
      enable a user to input a selection to perform a search, within the one or more document pages rendered via the web browser, including one or both of synonym matches and syntactically similar matches for a search term that the user enters via the search tool;
      receive, via the search tool, a search term entered by the user;
      responsive to the selection to perform the search, conduct the search in accordance with the selection by traversing the one or more document pages rendered via the browser to discover one or more of exact, synonym, or syntactically similar matches for the search term entered by the user; and for words that constitute matches, highlight the words in context within the one or more document pages.

16. One or more computer-readable of claim 15, wherein the search tool is further configured to:

enable input of a selection of one or more contextual choices to control the search; and conduct the search in accordance with the selection of the one or more contextual choices.

17. One or more computer-readable of claim 15, wherein the search tool is further configured to perform spell checking of the search term entered by the user and, if appropriate, offer options for a misspelled word.

18. One or more computer-readable of claim 15, wherein the search tool is further configured to ascertain whether there are multiple synonym groups corresponding to the search term entered by the user and, if appropriate, offer options to enable a selection of a particular group of the multiple synonym groups to use for the search.

19. One or more computer-readable of claim 15, wherein to highlight comprises using color coding techniques to visually highlight words that are synonym matches and words that constitute syntactic matches in different respective colors.

20. One or more computer-readable of claim 15, wherein the one or more display portions comprise one or more tabs of the browser.

* * * * *